(12) United States Patent
Johri et al.

(10) Patent No.: US 9,738,265 B2
(45) Date of Patent: Aug. 22, 2017

(54) SYSTEM AND METHOD FOR DETERMINING ENGINE DISCONNECT CLUTCH TORQUE

(71) Applicant: FORD GLOBAL TECHNOLOGIES, LLC, Dearborn, MI (US)

(72) Inventors: Rajit Johri, Ann Arbor, MI (US); Wei Liang, Farmington Hills, MI (US); Mark Steven Yamazaki, Canton, MI (US); Xiaoyong Wang, Novi, MI (US); Ryan Abraham McGee, Shanghai (CN); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/223,048

(22) Filed: Mar. 24, 2014

(65) Prior Publication Data

US 2015/0266462 A1    Sep. 24, 2015

(51) Int. Cl.
*B60W 10/08* (2006.01)
*B60W 10/02* (2006.01)
(Continued)

(52) U.S. Cl.
CPC ........... *B60W 10/08* (2013.01); *B60K 6/48* (2013.01); *B60W 10/02* (2013.01); *B60W 20/00* (2013.01); *B60K 2006/4825* (2013.01); *B60W 20/40* (2013.01); *B60W 2050/004* (2013.01); *B60W 2510/0638* (2013.01);
(Continued)

(58) Field of Classification Search
CPC ...... B60W 20/00; B60W 20/40; B60W 10/08; B60W 10/02; Y10S 903/902
See application file for complete search history.

(56) References Cited

U.S. PATENT DOCUMENTS 5,659,472 A * 8/1997 Nishino ............... B62D 5/0487
701/41
8,760,101 B2 * 6/2014 Babando et al. ............. 318/471
(Continued)

FOREIGN PATENT DOCUMENTS

| JP | 2008074240 A | * | 4/2008 | |
| JP | 2009236729 A | * | 10/2009 | |
| SU | EP 0351429 A1 | * | 1/1990 | ........... F02D 31/007 |

OTHER PUBLICATIONS

Zhang et al., "A study on control of lockup clutch of hybrid vehicle's torque converter," Year: 2011, pp. 5659-5662.*
(Continued)

*Primary Examiner* — Tuan C. To
(74) *Attorney, Agent, or Firm* — David B. Kelley; Brooks Kushman P.C.

(57) ABSTRACT

A system and method for estimating disconnect clutch torque during engine start with the motor in vehicles having an engine selectively coupled to the motor and transmission may be configured to control motor torque based on a clutch torque estimated from a difference in a measured powertrain state and a predicted powertrain state using motor torque as an input. The powertrain states may include, for example, motor speed, turbine speed, engine speed and clutch torque. An adaptive gain may be used to drive the difference between measured and estimated clutch torque toward zero.

15 Claims, 6 Drawing Sheets

(51) Int. Cl.
    *B60W 20/00*     (2016.01)
    *B60K 6/48*     (2007.10)
    *B60W 20/40*     (2016.01)
    *B60W 50/00*     (2006.01)

(52) U.S. Cl.
    CPC ............... *B60W 2510/0652* (2013.01); *B60W 2510/081* (2013.01); *B60W 2510/082* (2013.01); *B60W 2510/102* (2013.01); *B60W 2510/1015* (2013.01); *B60W 2710/083* (2013.01); *Y02T 10/6221* (2013.01); *Y02T 10/6252* (2013.01); *Y02T 10/84* (2013.01); *Y10S 903/902* (2013.01)

(56) References Cited

U.S. PATENT DOCUMENTS

| | | | | |
|---|---|---|---|---|
| 2003/0184152 | A1* | 10/2003 | Cikanek | B60K 6/48 303/152 |
| 2005/0256623 | A1* | 11/2005 | Hubbard | B60L 11/123 701/54 |
| 2007/0056784 | A1 | 3/2007 | Joe et al. | |
| 2008/0132379 | A1* | 6/2008 | Matsubara | B60K 6/40 477/3 |
| 2008/0139350 | A1* | 6/2008 | Iwasa | F16H 59/70 474/18 |
| 2009/0095255 | A1* | 4/2009 | Boutonnet | B60W 10/02 123/350 |
| 2010/0087996 | A1* | 4/2010 | Haggerty | B60K 6/445 701/58 |
| 2010/0138107 | A1* | 6/2010 | Morris et al. | 701/36 |
| 2010/0174431 | A1* | 7/2010 | Fukumura | B60W 40/12 701/22 |
| 2012/0081051 | A1 | 4/2012 | Kobayashi et al. | |
| 2012/0083952 | A1* | 4/2012 | Smith et al. | 701/22 |
| 2012/0108385 | A1* | 5/2012 | Sano | B60K 6/48 477/5 |
| 2012/0323418 | A1 | 12/2012 | Sah et al. | |
| 2013/0046429 | A1* | 2/2013 | Tashiro | B60K 6/448 701/22 |
| 2013/0131941 | A1* | 5/2013 | Kitahata | B60K 6/38 701/58 |
| 2014/0148306 | A1* | 5/2014 | Kim | B60W 10/02 477/5 |
| 2015/0112523 | A1* | 4/2015 | Wang et al. | 701/22 |
| 2015/0167615 | A1* | 6/2015 | Komuro | F02N 11/0851 290/31 |

OTHER PUBLICATIONS

Minseok et al., "Engine clutch control algorithm during mode change for parallel hybrid electric vehicle," Year: 2012, pp. 1118-1121.*

* cited by examiner

SYSTEM AND METHOD FOR DETERMINING ENGINE DISCONNECT CLUTCH TORQUE

TECHNICAL FIELD

The present disclosure relates to systems and methods for determining engine disconnect clutch torque in a hybrid vehicle having an engine selectively coupled to a traction motor and an automatic transmission.

BACKGROUND

Hybrid electric vehicles (HEV's) utilize a combination of an internal combustion engine with an electric motor to provide the power needed to propel a vehicle. This arrangement provides improved fuel economy over a vehicle that has only an internal combustion engine. Clutches may be used to control the power flow and during transient vehicle operations, such as pulling up the engine or the electric motor, to provide smooth operation for the driver.

For example, the engine may be shutdown in an HEV during times that the engine operates inefficiently, or is not otherwise needed to propel the vehicle. In these situations, the electric motor is used to provide all of the power needed to propel the vehicle. When the driver power demand increases such that the electric motor can no longer provide enough power to meet the demand, if the battery state of charge (SOC) drops below a certain level, or another vehicle system requires engine operation, the engine may need to start to provide additional power for the vehicle. Depending on the state of the vehicle, it may be desirable to start the engine using various control sequences with the powertrain, i.e. the engine, motor, transmission, etc., to meet the vehicle and driver requirements at the time.

SUMMARY

A system and method for estimating clutch torque during engine start with a traction motor in vehicles having an engine selectively coupled to the motor and transmission is disclosed. A controller may be configured to control motor torque based on clutch torque estimated from a difference in a measured powertrain state and a predicted powertrain state using motor torque as an input. The powertrain states may include, for example, motor speed, turbine speed, engine speed and clutch torque. An adaptive gain may be used to drive the difference between measured (or actual) clutch torque and estimated (or predicted) clutch torque toward zero.

In one embodiment, a hybrid vehicle includes an engine selectively coupled to a traction motor and a transmission by a disconnect clutch. The vehicle also includes a controller configured to control motor torque based on a clutch torque estimated from a difference in a measured powertrain state and a predicted powertrain state. The predicted powertrain state includes at least one of motor speed, engine speed, turbine speed and clutch torque. Clutch torque is further estimated using an adaptive gain calculated from the difference in the measured powertrain state and the predicted powertrain state, for example, motor and engine speed.

In another embodiment, a hybrid vehicle includes an engine and a transmission having gearing defining multiple torque flow paths from an input shaft to an output shaft of the transmission. The vehicle also includes a motor disposed between the engine and the transmission, wherein the engine is selectively coupled to the motor and the transmission by a disconnect clutch. A controller is configured to control motor torque during engine start with the motor based on a clutch torque estimated from a variance between a measured motor speed and a predicted motor speed. The predicted motor speed may be based on motor torque, motor dynamics and turbine dynamics and the measured motor speed may be determined from a speed sensor. The clutch torque may be further based on motor torque and an adaptive gain calculated from the variance between the measured motor speed and the predicted motor speed The controller may be configured to predict engine speed based on motor torque, engine torque and engine dynamics.

In yet another embodiment, a method for controlling a hybrid vehicle having an engine selectively coupled to a motor and a transmission is described. The method includes controlling motor torque based on a clutch torque estimated from a difference in a measured powertrain state and a predicted powertrain state. The method also includes estimating motor speed and turbine speed based on at least one of motor torque, motor dynamics and turbine dynamics. Clutch torque is also estimated from motor torque, engine torque and an adaptive gain calculated from the difference between a measured engine speed and a predicted engine speed.

Embodiments according to the present disclosure provide various advantages. For example, various embodiments reduce torque disturbances transmitted from the powertrain to the vehicle body, which reduces the unpleasant shift shock experienced by drivers. In addition, embodiments according to this disclosure provide for smooth engine start during engagement of the disconnect clutch. The above advantages and other advantages and features will be readily apparent from the following detailed description of the preferred embodiments when taken in connection with the accompanying drawings.

DETAILED DESCRIPTION

As required, detailed embodiments of the claimed subject matter are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the claimed subject matter.

Vehicle manufacturers are improving powertrain and driveline systems for hybrid vehicles to meet the demand for increased fuel efficiency and lower emissions. One such improvement may include a traction motor disposed between an automatic transmission and an engine. The engine may be selectively coupled to the traction motor and the automatic transmission by a disconnect clutch. The disconnect clutch may allow the vehicle to operate in an electric-only drive mode with the traction motor acting as the primary power source (engine disconnected), in a hybrid mode with both the traction motor and the engine propelling the vehicle, and/or in an engine-only mode in which the vehicle is propelled by the engine alone.

Figure 1:
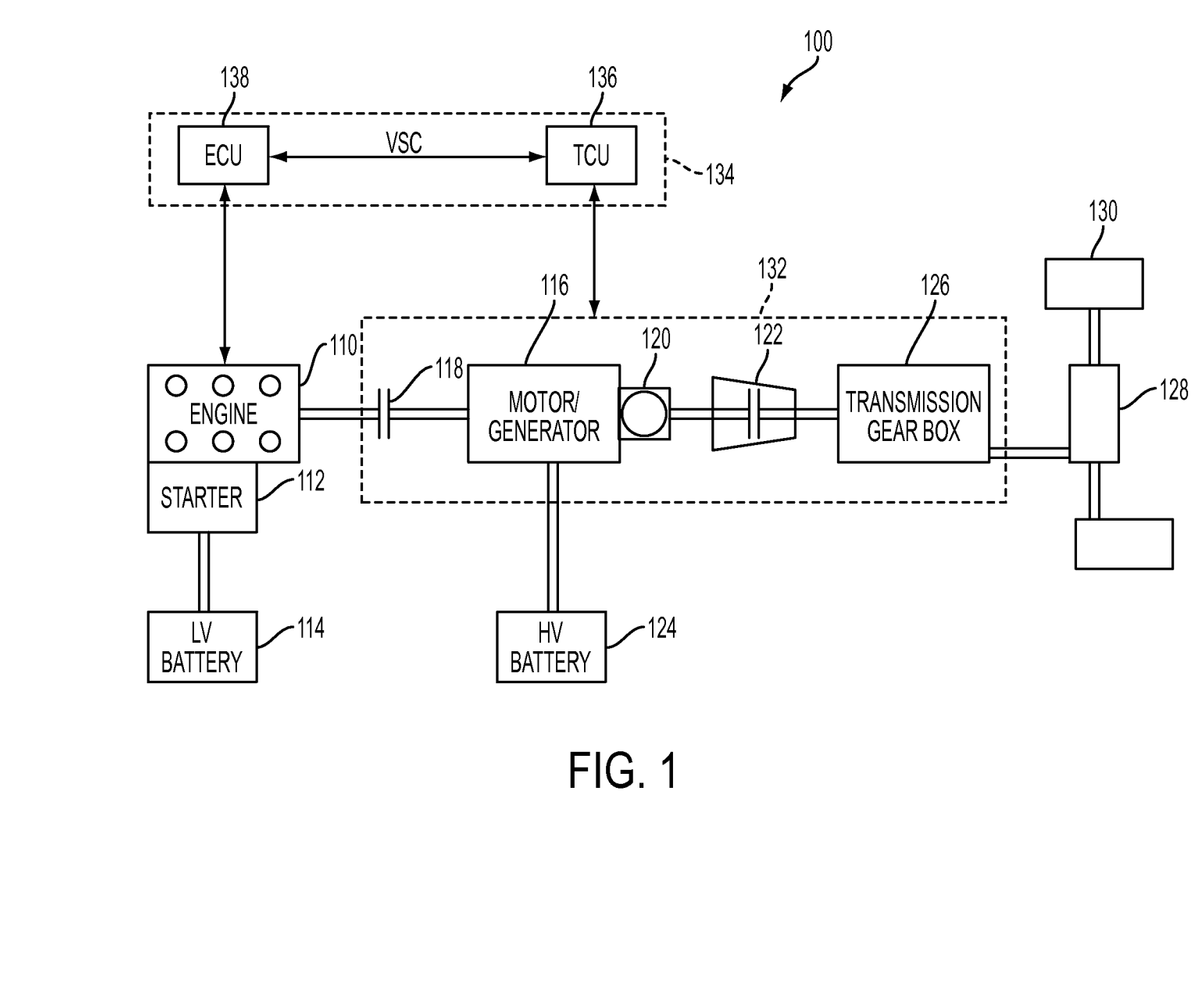
FIG. 1 is a schematic representation of a hybrid vehicle powertrain in accordance with embodiments of the present disclosure.

Referring to FIG. 1, a schematic representation of a hybrid vehicle 100 according to an embodiment of the present disclosure is shown. An engine 110 may be operatively connected to a low voltage starter 112 that may be used to start the engine 110 when additional torque is needed. The low voltage starter 112 may be powered by a low voltage battery 114. An electric machine 116, or traction motor, may be operatively connected to a driveline and positioned between the engine 110 and the transmission 126, or gear box. The electric machine 116 may be powered by a high voltage battery 124. The engine 110 may be selectively coupled to the motor 116 and the transmission 126 by a disconnect clutch 118, which allows the engine 110 to be decoupled and shutdown independent of vehicle operation. Torque transmitted from the engine 110 and motor 116 may be provided through the driveline to the transmission 126, which provides torque to differential 128 to drive the wheels 130.

As shown in FIG. 1, a torque converter 122 having a bypass clutch to lock the impeller and turbine, or alternately a launch clutch, may be located between the motor 116 and transmission 126, and can be used for torsional isolation. A transmission oil pump 120 may also be located on the same shaft as the motor 116, which provides oil flow through the transmission 126 for lubrication and hydraulic operation. This main pump 120 may be supplemented by an electric auxiliary pump.

The vehicle may include a vehicle system controller (VSC) 134 for controlling various vehicle systems and subsystems. The VSC 134 may include various types of computer readable storage media to implement volatile and/or persistent memory. In one embodiment, VSC 134 includes an engine control unit (ECU) 138 and a transmission control unit (TCU) 136. The ECU 138 is electrically connected to the engine 110 for controlling the operation of the engine 110. The TCU 136 is electrically connected to and controls the motor 116 and the transmission 126, as depicted at 132. The ECU 138 is in communication with the TCU 136 and other controllers (not shown) over a vehicle network using a common bus protocol (e.g., CAN), in accordance with one or more embodiments of the present disclosure. Although the illustrated embodiment depicts the VSC 134 functionality for controlling the hybrid powertrain as being contained within two controllers (ECU 138 and TCU 136), other embodiments of the hybrid vehicle may include a single VSC controller and/or any other combination of controllers for controlling the hybrid powertrain.

Under normal operation, the driver requests are interpreted by the VSC 134. These requests include gear selection (PRNDL) and accelerator pedal position (APPS) to interpret the driver's intention of wheel torque. The driver's input on the brake pedal (BPPS) is interpreted by the Brake System Control Module (BSCM) and a wheel torque modification request is sent to VSC 134 to adjust the final wheel torque. The high voltage battery controller (BECM) monitors the battery temperature, voltage, current, SOC and determines the maximum allowable discharge power limit and the maximum allowable charge power limit. The VSC 134 determines the powertrain operating point to maintain battery state of charge, minimize fuel consumption and deliver the driver demanded vehicle operation. A Torque Control (TC) feature inside VSC 134 is in charge of determining torque split between the engine and motor torque command. The TC calculates the battery charging power request based on present driver power demand and SOC. Based on the energy management algorithm, the TC can demand engine on/off to switch between electric-only and hybrid mode. As previously discussed, the engine may be started using the motor by engaging the disconnect clutch 118 or by using the low voltage starter 112.

Figure 2:
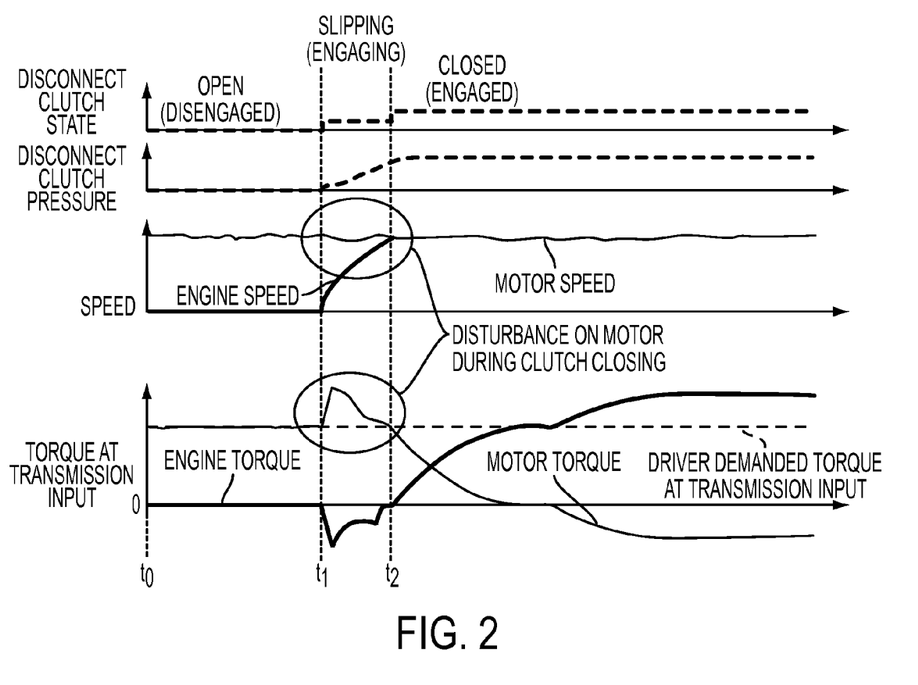
FIG. 2 is a graph illustrating engagement of a disconnect clutch in a hybrid vehicle during engine start in accordance with embodiments of the present disclosure.

Referring to FIG. 2, a graph illustrating engagement of a disconnect clutch in a hybrid vehicle during engine start is shown. From $t_0$ to $t_1$, the clutch is open, and disconnect clutch torque is zero. From $t_1$ to $t_2$, the clutch is closing, and the torque capacity is variable. This is the area of interest in this disclosure. From $t_1$ to $t_2$, the clutch is closed. The clutch torque is equal to the engine torque. It is notoriously difficult to determine clutch torque while a clutch is closing, and expensive to measure. This disclosure provides a system and method of estimating the clutch torque while the clutch is slipping using speed sensors already present in the powertrain. A model of the clutch is maintained in the controller, and updated in real time. The disturbance detected by the speed sensors serves as input to the model, and the model is updated accordingly. This provides not only a robust solution, but one which represents a lower cost, as compared to using an actual torque sensor.

As described above, some hybrids include an engine selectively coupled to an electric machine and a transmission. In hybrids such as these, the engine can be started using a low voltage starter. Alternatively the engine can be started by engaging the disconnect clutch and using the motor to start the engine. During engagement, there is a torque transfer from the motor to the engine to overcome compression and friction torque before the engine starts producing torque. During this phase of engine starting, if the incipient clutch torque is not compensated, the motor speed will drop—thereby dropping impeller speed and creating a torque hole in driveline torque. For a smooth engine start and overcoming disturbance rejection from driveline torque due to engine start, it is necessary to estimate the clutch torque. The clutch torque is difficult to estimate and measurement would require a torque sensor onboard a production vehicle, which is costly. As such, the present disclosure provides a system and method for estimating clutch torque during engine start or other events where the clutch is not fully locked.

More specifically, a control algorithm for estimating the clutch torque based on the error between measured (or actual) and estimated (or predicted) powertrain states using a simplified powertrain dynamics model is described. The algorithm includes a simplified powertrain model with the clutch modeled as an internal state of the plant. The powertrain model is fed with the motor torque as input. Based on powertrain model dynamics, the motor speed, turbine speed and clutch torque are predicted. Since the initial estimate of clutch torque is not accurately known and due to small errors in the knowledge of the powertrain model dynamics, the predicted motor speed will be different from the actual measured motor speed. The error in speed prediction is then fed through an adaptive algorithm. The algorithm modifies the input to the powertrain model to drive the error difference in predicted and measured motor speed, as well as turbine speed, to zero. This also results in driving the estimate of clutch torque to actual clutch torque.

The estimated clutch torque can then be used as feed forward to the motor controller for compensating for engine compression and friction torque during engine starts with the motor. Additionally, the algorithm can be used for clutch torque estimation during other events where the clutch is not fully locked.

When the disconnect clutch is engaged to start the engine, the motor in addition to delivering torque to the driveline, also provides additional torque to overcome the engine compression and friction torque. The proposed algorithm uses a powertrain dynamics model to predict this additional disturbance torque on the motor during engine start events. The powertrain model has three states:

$$x=[\omega_m, \omega_{turbine}, \tau_{clutch}]^T \quad (1)$$

where $\omega_m$ is the motor/impeller speed, $\omega_{turbine}$ is the turbine speed and $\tau_{clutch}$ is the clutch torque. The motor and torque converter turbine state dynamics is as follows:

$$\dot{\omega}_m = (\tau_m - \tau_{clutch} - \tau_{pump})/I_m \quad (2)$$

where $\tau_m$ is the motor torque, $\tau_{pump}$ is the torque converter impeller load and $I_m$ is the combined inertia of the motor, disconnect clutch, and torque converter impeller i.e. effectively everything spinning with the motor.

The clutch torque $\tau_{clutch}$ can be calculated using Equation (2) if motor acceleration $\omega_m$ is known. Mathematically, the motor acceleration $\omega_m$ can be calculated by numerically differentiating the motor speed $\omega_m$. However, numerical differentiation results in amplification of noise in the original signal and the resulting motor acceleration signal is noisy. The proposed estimation method calculates clutch torque without explicitly differentiating the motor speed signal, as shown in Equations (3) and (4):

$$\dot{\omega}_{turbine} = (\tau_{turbine} - \hat{\delta}_{vehload})/I_{veh} \quad (3)$$

$$\dot{\omega}_{turbine} = (\tau_{turbine} - \mu Mg - 0.5 C_d \rho A_{veh} v^2)/(Mr) \quad (4)$$

where $\tau_{turbine}$ is the torque converter turbine torque, $\mu$ is the rolling friction coefficient, M is the mass of vehicle, $C_d$ is the coefficient of drag, $A_{veh}$ is the frontal area of the vehicle, v is the vehicle velocity, and r is the effective wheel radius.

Figure 3A:
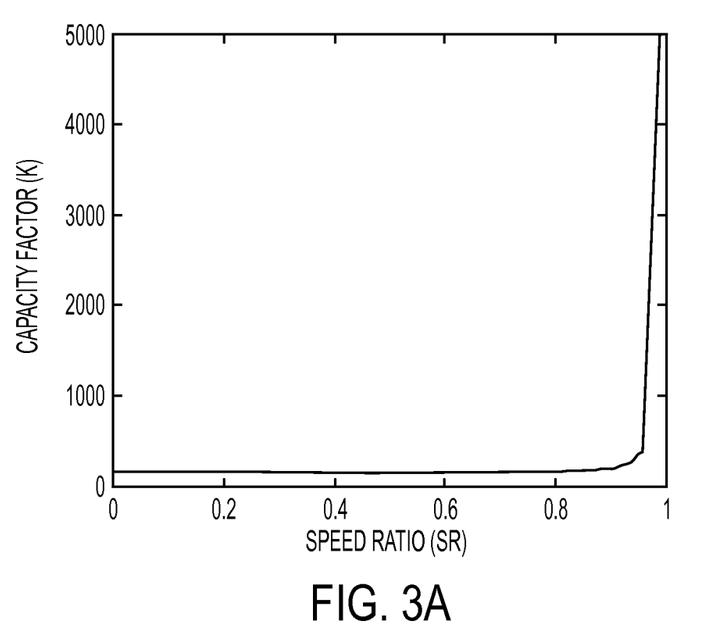
FIG. 3A is a graph illustrating a capacity factor curve for a given torque converter in accordance with embodiments of the present disclosure.
Figure 3B:
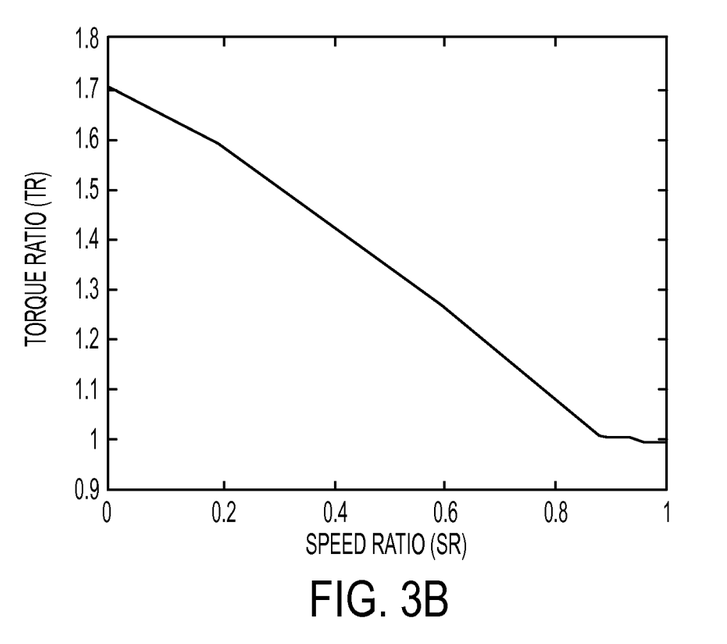
FIG. 3B is a graph illustrating a torque ratio curve for a given torque converter in accordance with embodiments of the present disclosure.

As shown in Equations (5) and (6), the torque converter turbine and impeller torques are calculated as follows using the capacity factor and torque ratio curves:

$$\tau_{pump} = \left(\frac{\omega_m}{K(SR)}\right)^2 \quad (5)$$

$$\tau_{turbine} = \tau_{pump} * T_R(SR) \quad (6)$$

$$SR = \frac{\omega_m}{\omega_t} \quad (7)$$

where for a given torque converter K is the capacity factor curve, $T_R$ is the torque ratio curve and both are a function of the speed ratio, SR, as shown above in Equation (7). FIGS. 3A and 3B illustrate a representative capacity factor curve and torque ratio curve, respectively, according to an embodiment of this disclosure. Additionally, as shown in Equation (8), the clutch torque is modeled with zero dynamics.

$$\dot{\tau}_{clutch} = 0 \quad (8)$$

Alternatively, engine dynamics may be used as well to estimate clutch torque. The engine dynamics is given by Equation (9) and is calculated as follows:

$$\dot{\omega}_e = \frac{(\tau_e - \tau_{clutch})}{I_e} \quad (9)$$

where $\tau_e$ is the engine torque and $I_e$ is the inertia of the engine. The algorithm would remain the same with just the addition of the engine speed as a powertrain state (e.g., $x=[\omega_e, \omega_m, \omega_{turbine}, \tau_{clutch}]^T$) and could be used to help drive the error between estimated and actual clutch torque to zero. An engine speed sensor may be used to measure the actual engine speed. The measured engine speed can be compared with the predicted engine speed, which can be determined from using the equations above. The error between measured and predicted powertrain states can then be fed into the adaptive gain algorithm.

Figure 4:
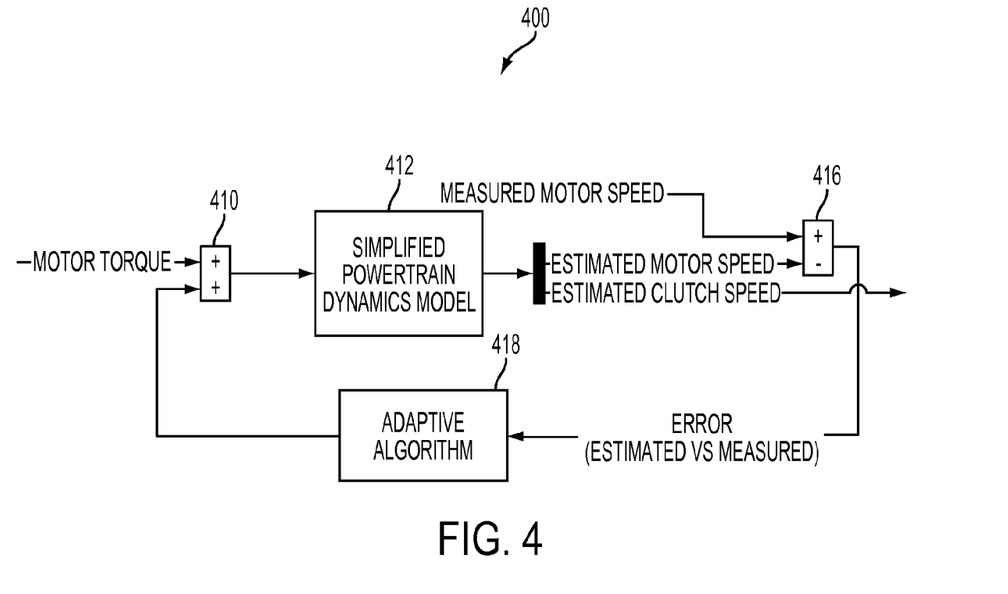
FIG. 4 is a flow chart depicting a control algorithm for estimating clutch torque.

The above powertrain model may be used to calculate powertrain system states using the motor torque as the input. FIG. 4 provides a block diagram implementation of the control algorithm that may be used to calculate such powertrain system states. Specifically, motor torque is used as an input 410 to the simplified powertrain dynamics model 412. The simplified powertrain dynamics model 412 uses the equations described above to estimate and/or predict motor speed, engine speed, turbine speed and clutch speed. The estimated (or predicted) motor speed is compared with the measured motor speed at 416. The error between measured and predicted motor speed is fed into the adaptive algorithm 418. As mentioned above, the powertrain model can also use the error between measured and predicted engine speed, as well, to estimate clutch torque. Due to the error in initialization of clutch torque state and unmodeled plant dynamics, the predicted states will differ from the measured states i.e. motor, turbine and/or engine speed. The error between predicted and measured states is then multiplied with an adaptive gain L and added to the plant model input. The gain L is adapted using an adaptive algorithm to drive the error in predicted and measured motor, turbine and/or engine speed to zero. This also results in driving the estimate of clutch torque to actual clutch torque.

Figure 5:
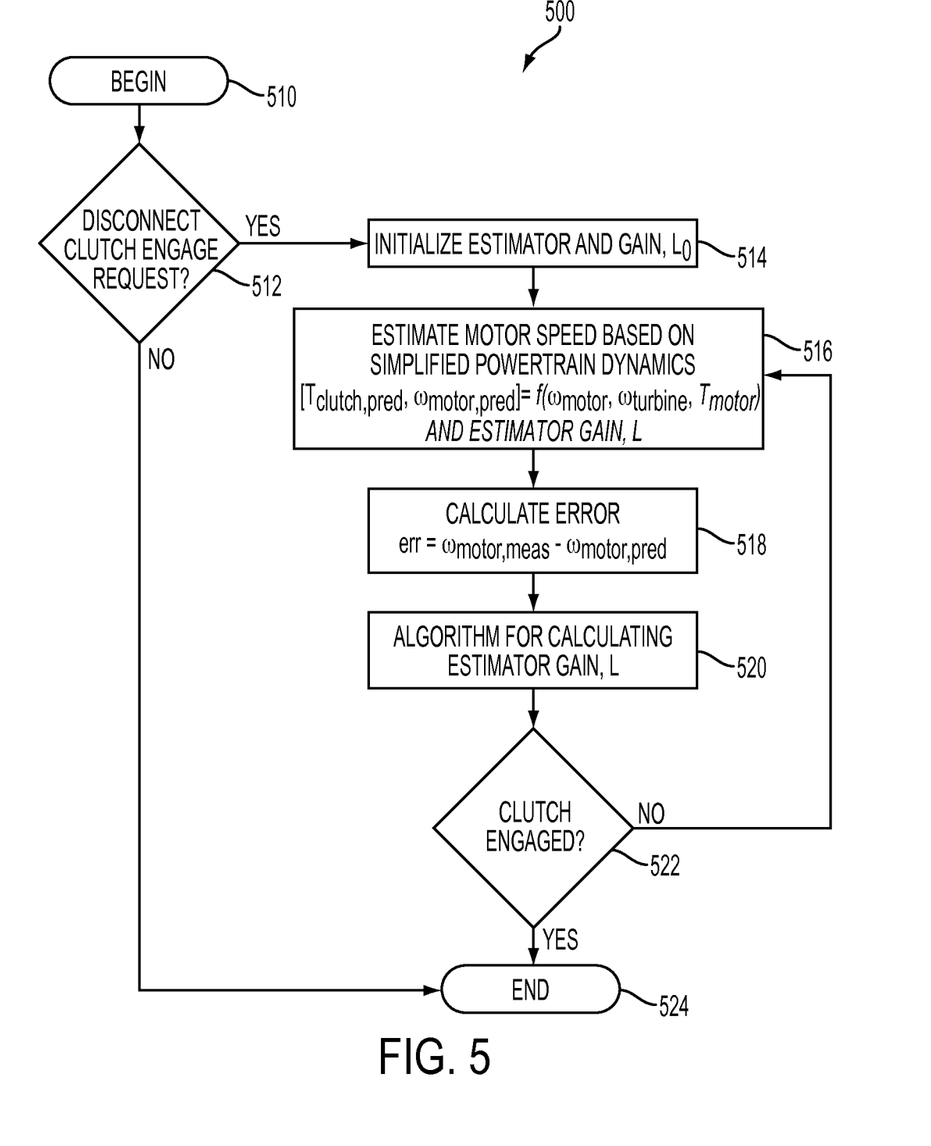
FIG. 5 is a flow chart illustrating one method for estimating clutch torque during engine start according to an embodiment of the present disclosure.
Figure 6:
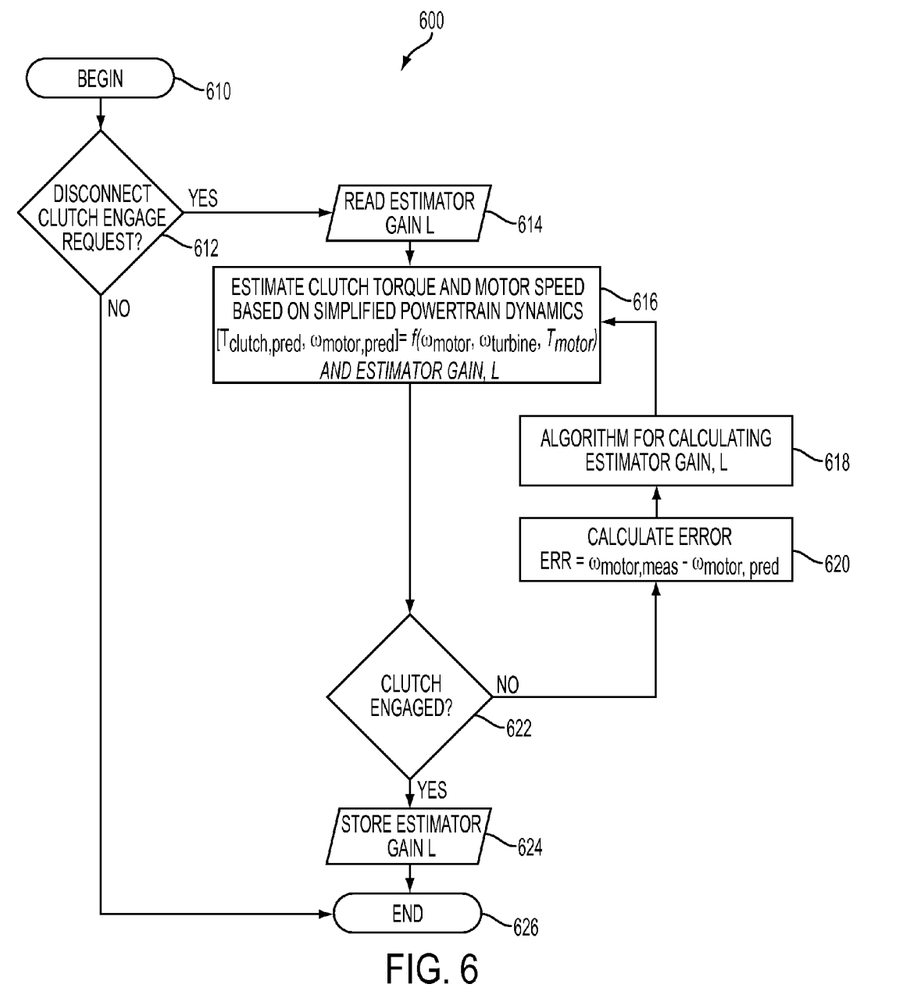
FIG. 6 is a flow chart illustrating another method for estimating clutch torque during engine start according to yet another embodiment of the present disclosure.

FIGS. 5 and 6 illustrate methods for estimating clutch torque according to embodiments of the present disclosure. As those of ordinary skill in the art will understand, the functions represented in FIGS. 5 and 6 may be performed by software and/or hardware depending on the particular application and implementation. The various functions may be performed in an order or sequence other than illustrated in FIGS. 5 and 6 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated. In one embodiment, the functions illustrated are primarily implemented by software, instructions, or code stored in a computer readable storage device and executed by one or more microprocessor-based computers or controllers to control operation of the vehicle.

With reference to FIG. 5, the described control strategy 500 runs every instance 510 there is a request 512 to engage the disconnect clutch and start the engine using the motor. The control strategy 500 is initialized with present motor speed, motor torque, torque converter turbine speed, zero clutch torque and an initial gain $L_0$ 514. Alternatively, engine speed and engine torque may be used as well. The control strategy 500 then uses a simplified powertrain dynamics model to estimate/predict motor speed, turbine speed and clutch torque 516. At block 518, the control strategy calculates the error between measured motor speed and predicted motor speed. The error is then fed into the adaptive algorithm 520 for calculating a new value for the estimator gain, L. The adaptive gain can be calculated using Recursive Least Squares, Kalman filter or any other method known in the field. The algorithm runs in a loop until the clutch is fully engaged and locked 522. The control strategy ends at 524 either when there is no request to engage the disconnect clutch or the disconnect clutch is fully engaged and locked. As stated above, the controller can estimate clutch torque based on the error between actual/measured engine speed and predicted engine speed using the above-disclosed method.

Alternatively, instead of resetting the gain to $L_0$ at the start of the algorithm, the last adapted value of gain L can be used as the initial value for the next engine start event. This alternative method is described in more detail in FIG. 6. FIG. 6 illustrates yet another method for estimating clutch torque according to embodiments of the present disclosure. Specifically, the control strategy 600 begins at block 610 where the controller checks to see if there is a request to engage the disconnect clutch 612. If there is no request at 612, then the control strategy ends at block 626. However, if there is a request to engage the disconnect clutch at 612, then the controller reads the stored value of the estimator gain, L 614 and uses it along with motor torque to estimate motor speed, turbine speed, and clutch torque 616. The controller then checks to see if the clutch is engaged 622. If the clutch is not engaged at 622, then the error 620 between measured motor speed and predicted motor speed is calculated. This error value is then fed to an adaptive algorithm 618 for driving the error between measured and predicted motor speed to zero, and hence, the error between estimated and actual clutch torque. The motor speed, turbine speed and clutch torque are estimated using the new estimator gain, L and the process is repeated until the clutch locks at 622. When the clutch locks, the last calculated value of the estimator gain, L is stored 624 for use when there is another request to engage the disconnect clutch. The control strategy ends at block 626. Likewise, measured and predicted engine speed, along with engine torque, can be used to estimate clutch torque using the methods disclosed above.

As can be seen by the representative embodiments described herein, embodiments according to the present disclosure help mitigate the challenges posed by using the motor to start the engine in vehicles having an engine selectively coupled to both the motor and transmission. Through use of the disclosed operating strategies, the clutch torque can be estimated without use of a torque sensor onboard the vehicle, which can be costly.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A hybrid vehicle, comprising:
   an engine;
   a transmission having gearing defining multiple torque flow paths;
   a motor disposed between the engine and the transmission, the engine being selectively coupled to the motor and the transmission by a disconnect clutch; and
   a controller configured to control motor torque during engine start with the motor based on a clutch torque estimated from a variance between a measured motor speed and a predicted motor speed.

2. The hybrid vehicle of claim 1, wherein the predicted motor speed is based on motor torque, motor dynamics and turbine dynamics.

3. The hybrid vehicle of claim 1, wherein the controller is further configured to predict engine speed based on motor torque, engine torque and engine dynamics.

4. The hybrid vehicle of claim 1, wherein the clutch torque is further based on motor torque and an adaptive gain calculated from the variance between the measured motor speed and the predicted motor speed.

5. The hybrid vehicle of claim 1, wherein the clutch torque is further estimated from motor torque, engine torque and an adaptive gain calculated from a difference between a measured engine speed and a predicted engine speed.

6. A method for controlling a hybrid vehicle having an engine selectively coupled to a motor and a transmission via a clutch, comprising:
   in response to a vehicle request to (i) engage the clutch to couple the engine to the motor and the transmission and (ii) start the engine via the motor, supplying motor torque to a vehicle driveline using the motor, wherein motor torque supplied is based on a clutch torque estimated from a variance between a measured motor speed and a predicted motor speed.

7. The method of claim 6, wherein the predicted motor speed is based on motor torque, motor dynamics and turbine dynamics.

8. The method of claim 6, further comprising:
   predicting engine speed based on motor torque, engine torque and engine dynamics.

9. The method of claim 6, wherein the clutch torque is further estimated from motor torque and an adaptive gain calculated from a difference between the measured motor speed and the predicted motor speed.

10. The method of claim 6, wherein the clutch torque is further estimated from motor torque, engine torque and an adaptive gain calculated from a difference between a measured engine speed and a predicted engine speed.

11. The method of claim 10, wherein the measured engine speed is measured from an engine speed sensor.

12. The method of claim 6, wherein the measured motor speed is measured from a motor speed sensor.

13. The method of claim 6, wherein the clutch torque is further estimated using an adaptive gain calculated from a difference in a measured powertrain state and a predicted powertrain state.

14. The method of claim 13, wherein the predicted powertrain state includes at least one of motor speed, engine speed, turbine speed and clutch torque.

15. The method of claim 13, wherein the measured powertrain state includes at least one of motor speed, engine speed and turbine speed.

* * * * *